Figure 1:
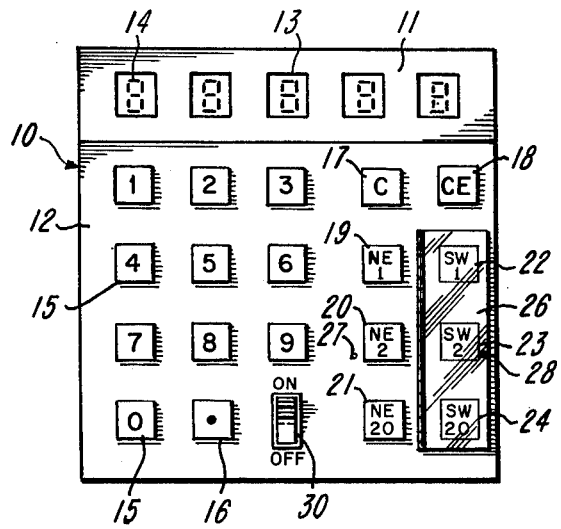

United States Patent

Opper

[11] 4,068,308
[45] Jan. 10, 1978

[54] CALCULATOR-LIKE DEVICE ESPECIALLY USEFUL AS AN ADJUNCT TO A CB RADIO

[76] Inventor: Lincoln I. Opper, 39 Silk Oaks Drive, Ormond Beach, Fla. 32074

[21] Appl. No.: 706,437

[22] Filed: July 19, 1976

[51] Int. Cl.² ............................................. G06F 15/02
[52] U.S. Cl. .................................... 364/449; 364/708; 235/92 DN
[58] Field of Search ........... 235/150.2, 150.27, 151.32, 235/92 DN, 92 TC, 61 J; 340/172.5

[56] References Cited

U.S. PATENT DOCUMENTS

| | | | |
|---|---|---|---|
| 3,843,874 | 10/1974 | Kelch | 235/150.2 |
| 3,845,289 | 10/1974 | French | 235/150.2 X |
| 3,924,111 | 12/1975 | Farris | 235/150.27 X |
| 3,925,641 | 12/1975 | Kashio | 235/150.2 |
| 3,983,378 | 9/1976 | Tammi | 235/151.32 |

*Primary Examiner*—Edward J. Wise
*Attorney, Agent, or Firm*—Jerome P. Bloom

[57] ABSTRACT

A device useful in a moving vehicle to locate the position of the vehicle relative to a particular point of reference at any time the vehicle is moving along a given highway. The device resembles a calculator in form and employs storage or memory banks the elements of which are key controlled. Numerical key controlled means are provided for input to said device of numerical information respectively to identify a point of reference along a given highway and individual mileage readings referenced to spaced locations along said highway. Function keys are provided to store this numerical input in said storage or memory banks and the last to operate of said function keys is arranged to interrelate the stored numerical information and to transmit an output signal from said device which enables an accurate location of the position of said vehicle along said highway in accordance with the last numerical input.

In preferred embodiments of the invention the function keys are variously provided so that the user of the device may obtain the desired information as referenced to a highway mile marker system irrespective of whether the mile marker numbers, as observed, are progressively increasing or decreasing in the direction of travel.

12 Claims, 3 Drawing Figures

CALCULATOR-LIKE DEVICE ESPECIALLY USEFUL AS AN ADJUNCT TO A CB RADIO

BACKGROUND OF THE INVENTION

This invention relates to a calculator-like device particularly useful in conjunction with a Mobile Citizens Band Radio, or the like, in identifying for others and for one's self a highway location.

The embodiment of the invention described herein is particularly designed to utilize the information provided by a normal highway mile marker system to determine the location of a moving vehicle on a given highway at any particular time after leaving a point of reference. It should be understood, however, the utilization of the device in the manner noted need not depend upon mile markers as a point of reference.

The Mobile Citizens Band Radio, hereinafter referred to as a CB radio, is popular among drivers of all types of vehicles. It serves primarily as a ready means of communication between the drivers and is a particularly valuable asset when a driver wishes to reach the police or any other emergency service within the range of his radio transmitter. In this last respect it is most important that a driver be able to accurately locate his position when encountering or passing a problem on the highway.

Most federal highways do have mile markers showing, in progressively changing numbers, the distance from the beginning of the highway at a state line, and these markers are normally a good means of identifying a location of trouble. However, such markers are not always available or observable from a moving vehicle. They may be either missing or obscured and therefore not available when needed. Another problem in dealing with mile marker numbers is that when a vehicle is traveling in one direction, such as north or east bound, the numbers progressively change in the different sense than when a vehicle is traveling in the opposite direction, namely south and west bound. As a result, in order to properly orient one's self as to the location of a trouble area along the highway the driver must be alert to this fact. This could cause problems because normally a driver has to be very careful in performing the mental calculation necessary to position the vehicle relative to a point of reference for the emergency service contact. If there are serious emergency problems, and particularly when observed while driving at highway speeds, quick and accurate mental calculations are not normally reasonably possible. Moreover these can be distracting to the driver and add to the problem which already exists in the trouble area.

It is to the solution of the aforementioned problems that the present invention is directed.

SUMMARY OF THE INVENTION

The instant invention has in view a calculator-like device particularly useful, in conjunction with a CB radio, in giving a highway position. The device corresponds in general structural terms and in general operational modes to the well-known small electronic calculator. It can as presently adapted be an independent unit resembling a pocket calculator or it can be incorporated into a CB radio as an integral part thereof, or it can be built into the vehicle itself. The device can be solely concerned with location, or it can have other driver or trip related capabilities as well.

In an illustrative embodiment, the device presents a display panel and a keyboard embodying numerical keys and keys of special function related to location identification. The special function keys occur in sets of keys selected for use according to the direction of travel. According to a feature of the invention, the sets of keys are provided in banks in a side by side relation and a plate member attached to the keyboard is manipulative to cover up or to block one bank of keys while exposing another. Under this arrangement, an operator may select one or another of a pair of sets of keys, according to vehicle direction, and block out the other set against possible misoperation. Numerical keys are used to enter into the device a mile marker number defining a vehicle starting position, and to enter into the device a starting odometer reading, and, subsequently, the odometer reading at the location to be identified. First and second special function keys of a selected set or bank are activated in connection with entry of the mile marker number and with entry of the starting odometer reading. A third special function key is activated in connection with entry of the subsequent odometer reading.

Internal operations of the device are carried out by special programming in the characteristic manner of a small electronic calculator, with the addition of one or more memory registers. In one example, the mile marker number is stored in one memory register and the starting odometer reading in another, responsive to actuation of the first and second special function keys of a selected set.

Upon entry of the subsequent odometer reading, and activation of the third special key of the selected set, starting and subsequent odometer readings are compared and a resultant added to or subtracted from the original mile marker number and the number so determined displayed. The operator or driver thereby has displayed before him the number, to the nearest tenth of a mile, of the vehicle location relative to the mile marker system. In his emergency CB report, therefore, he can precisely locate for others a particular highway position, having regard to the highway mile marker system and quickly locate his position relative to the emergency situation.

Other uses of the device are possible, as for example one in which an operator quickly and easily determines the remaining distance to a specific destination. According to this mode of use, there is entered into the device a present odometer reading and a number representing the distance to the specific destination. A subsequently entered odometer reading and operation of an activating key will result in display of a number representing in miles the remaining distance to be traveled. This operation is one which may be carried out independently of CB equipment. The sequence could also be reversed to remind the operator of the approximate odometer reading to appear when the destination is reached.

The device can also have, but is not restricted to, other features. For example the device can have a self-contained power source, or can derive its power from the vehicle or other means. The device can indicate the last reading continually, or can shut down the display but continue to hold entered data for future use and display. The device can be programmed to calculate, through a timing device, increasing or decreasing sequences established by entering approximate highway speed. It can also be activated through electronic, or mechanical means, from the vehicle, to increase or decrease the display related to actual distance traveled thereby becoming similar to an auxiliary or primary vehicle mileage indicator that is resettable for specific highway locations. In this connection, while reference has been made herein to a vehicle odometer, it will be understood that what is identified is a vehicle mileage indicator of whatever type may be present in the vehicle. The device can also be designed to serve as a clock displaying the local time when not displaying location numbers and while maintaining the appropriate entered data required for further use. As may be further seen, a number of other specific functions required by the complexity of driver needs can be designed into the calculator device. For example, the device could be used for log keeping, such as to record and total highway tolls paid on the trip, or total money expended in various other categories. A keyboard of the calculator device would in these various circumstances be provided with appropriate function keys and suitable internal programming.

An object of the invention is to provide a calculator-like device of varied utility to highway users, particularly as a means of accurately locating a vehicle position within and relative to a highway mile marker system.

Another object of the invention is to provide a calculator adaptation with function keys for determining a highway position relative to the mile marker system irrespective of the direction of vehicle travel.

A further object of the invention is to facilitate selection of different sets of function keys in a calculator-like device using an adjustable means to block out one set of keys while exposing another.

Still another object of the invention is to utilize conventional electronic calculator principles in the providing of a device of special use to highway users, particularly but not only in connection with CB radio equipment.

A still further object of the invention is to provide a calculator-like device which can be incorporated into a CB radio for use therewith.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Figure 2:
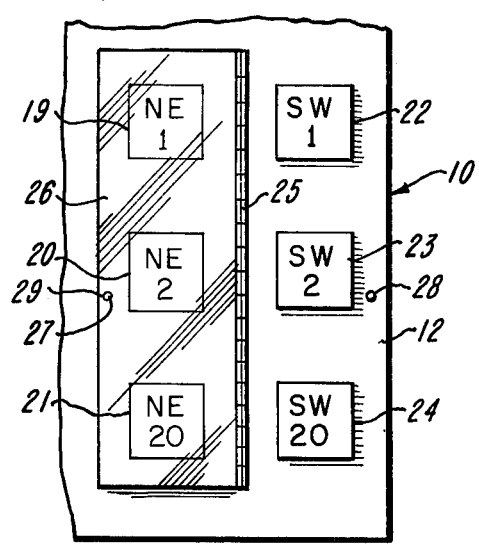
Figure 3:
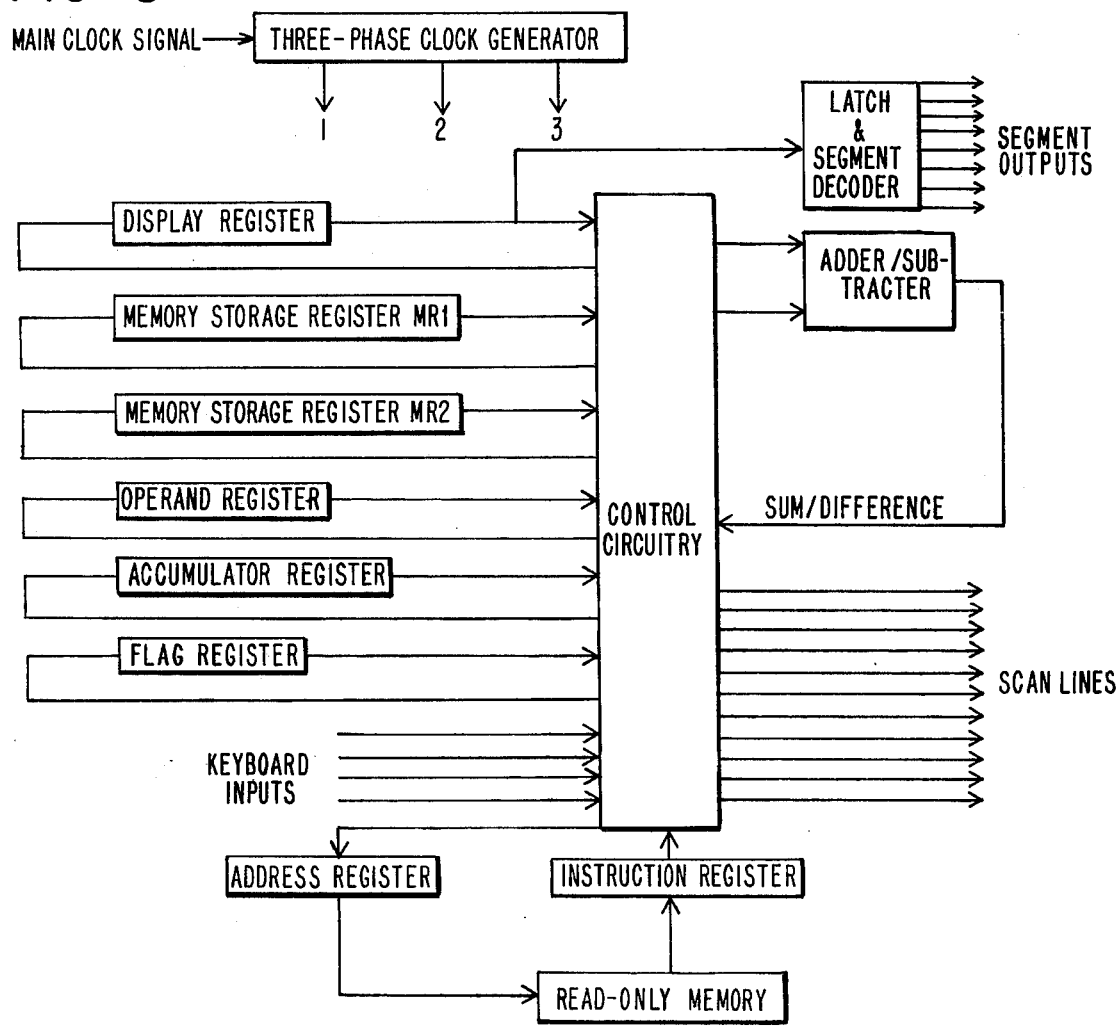

Referring to the accompanying drawings wherein is shown one but obviously not necessarily the only form of embodiment of the invention, FIG. 1 is a partly diagrammatic view of a calculator-like device according to the illustrated embodiment of the invention, showing the keyboard and display panel, a hinged cover on the keyboard being shown in one of its alternative positions of adjustment;

FIG. 2 is a fragmentary view, relatively enlarged to show details of the hinged cover and showing the cover in the other of its set positions of adjustment; and FIG. 3 is a schematic view of the integrated circuits of a microelectronic system of a typical small electronic calculator, modified according to teachings of the present invention.

Like parts are indicated by similar characters of reference throughout the several views.

In this disclosure of an illustrated embodiment of the invention, the structure and principles of operation of a small electronic calculator are dealt with in only a general way. In pocket size and desk size forms, the small electronic calculator has been in common use for several years. Its organization and mode of operation are well known, at least in broad terms. A reasonably complete disclosure of a typical calculator is contained in an article entitled "The Small Electronic Calculator" by Eugene W. McWhorter appearing in the March 1976 issue of Scientific American. Reference is made to that article for an understanding of basic calculator components and functions. The instant invention modifies the typical calculator by providing special function keys and by specifically programming memory and control circuits to respond to actuation of such keys. However, except as will hereinafter be specifically commented upon, internal components and the routing and handling of entered data is the same as is found in a typical small electronic calculator as presently known.

Referring to the drawings, a calculator-like device according to the present invention comprises a case 10 housing the internal circuitry of the device and presenting uppermost thereof a display panel 11 and a keyboard 12. The case 10 is in the illustrated instance an independent pocket size unit. Clearly, however, it could be built into a vehicle, as a part of the instrument dash or the like. Similarly, it could be an add-on feature of a CB radio or integrated into the radio construction for convenient operation in conjunction with operation of the radio.

The display panel 11 has a horizontal series of apertures 13 through each of which is visible an illuminable decimal point and a pattern of other light emitting diode segments 14 selectively illuminable to form a numeral zero to 9. On the keyboard 12 is a plurality of depressible numerical keys 15 in representations zero to 9, as well as a decimal key 16. Also on the keyboard are depressible keys 17 and 18 initiating "Clear" and "Clear Entry" functions whereby all non-permanent entries may be erased from holding circuits or only the last entered entry erased. Finally, and in accordance with the present invention, there is provided a first set of special function keys 19, 20, and 21 and a second set of special function keys 22, 23 and 24. They are for convenience arranged in side by side vertical rows or banks. Between the sets or banks is a hinge means 25, on the keyboard, providing a means by which a cover plate 26 may be pivotally attached to the keyboard. The plate 26 has a rectangular configuration and is dimensioned to cover one set only of the special function keys when superposed thereon. One longitudinal edge of the plate 26 is appropriately constructed to make a pivotal connection with hinge means 25. Using the hinge means 25 as a pivot, therefore, the plate 26 may be swung to alternative positions in which one set of the special function keys is exposed while the other set is covered or blocked out. The plate 26 may be made of any suitable lightweight but relatively rigid material and may be opaque, translucent or transparent. It is preferably, although not necessarily, held in set positions of adjustment so that vibration of handling will not cause the plate inadvertently to move from one adjusted position to another. Also, it is desirable that the plate be supported so that it cannot press against and cause a misoperation of underlying keys. Serving both these ends, in the illustrated instance, are pins 27 and 28 upstanding from the surface of the keyboard on opposite sides of the vertical rows of special function keys. The plate 26 has an aperture 29 adapted to make alternative friction engagements with upper extremities of the pins 27 and 28.

For reasons which will later be obvious, the special function keys 19, 20 and 21 are identified on their face as "NE1", "NE2", and "NE20". Similarly the keys 22, 23 and 24 are respectively identified as "SW1", "SW2", and "SW20".

Completing the keyboard of the device according to the illustrated embodiment of the invention is an on-off slide member 30 by which the device is energized and deenergized. The device is in this regard powered by the same means and in the same manner as is a conventional small electronic calculator, that is, by a power source which may be a self-contained rechargeable battery or batteries or vehicle power source means being provided for utilizing and applying the supplied power including a voltage regulator and an oscillator circuit generating a clock signal pulsing at a selected rate of cycles per second.

According to the illustrated embodiment of the invention, the keyboard is structured to perform locating functions although it could obviously be adapted by the provision of other special function keys and by arithmetical function keys to carry out other calculations. In the use of the illustrated device, the plate 26 is adjusted to expose a set of the special function keys agreeing with the direction the vehicle is traveling or is expected to travel. If that direction is north or east the plate 26 is adjusted to the position of FIG. 1 where "NE" keys are exposed and "SW" keys are blocked out. On the other hand if the direction of travel of the vehicle is or is expected to be south or west then plate 26 is adjusted to block out keys "NE" and to expose keys "SW", as seen in FIG. 2. Having made this adjustment, the operator uses slide 30 to energize the calculator device and depresses key 17 to clear the device of previously entered numbers. He then takes note of the number of the nearest highway mile marker and enters it into the device by depressing appropriate numerical keys 15. The entered number appears in the display panel apertures and can be verified, following which function key 19 or function key 22, whichever one is exposed, is depressed and the mile marker number appropriately stored. The operator then takes note of the number shown on the vehicle mileage indicator, which may be the vehicle odometer. He enters the number in the machine and depresses the exposed key 20 or 23 and the device effects appropriate storage. The calculator device may be programmed to turn off the display to conserve power while the vehicle proceeds along the highway and until it becomes desirable to determine the vehicle location. At this time, the operator, using the numerical keys 15, enters into the device the new or present number shown by the vehicle mileage indicator. This is followed immediately by depression of key 21 or 24, whichever is exposed, and, in accordance with the programming of the device, this produces a display on panel 11 of a number which is the number identifying the vehicle location relative to the highway mile marker system. This position can then be transmitted over the CB radio as a part of whatever report or warning the vehicle operator wishes to give to others. Information storage, handling and computation processes within the calculator-like device are carried out in a generally known manner, and it will be evident that the process in general may be one in which the difference between the starting and new mileage indicator numbers is obtained and added to or subtracted from the mile marker number, with the resultant being displayed at panel 11. These processes are, of course, well within the capability of known pocket type calculators and it is merely necessary to program the circuitry thereof appropriately to respond to depression of the special function keys. The alternativeness involved in adding or subtracting results from the necessity of dealing with mile marker numbers which increase when the vehicle moves in a north or east direction and which decrease when the vehicle moves in a south or west direction. When traveling north or east, therefore, the operator adjusts plate 26 to expose the "NE" set of keys and uses these in effecting his entries. Activation of the "NE20" key, therefore, adds to the entered mile marker number the difference between the starting and new vehicle mileage indicator numbers to arrive at the new correct mile marker number. Should the vehicle be moving in a south or west direction, however, with mile marker numbers decreasing, the "SW" function keys are exposed and activation of key 24 subtracts the mileage indicator difference from the entered mile marker number to arrive at the new mile marker number.

The numeral "20" as used on special function keys 21 and 24 derives from the 10 code as used by CB radio operators. In the language of CB, "10-20" relates to location and is frequently used to ask the question "What is your location?". Keys "1" and "2" of each set of function keys accordingly assume the character of preliminarily operated direction keys while the keys "20" become the finally activated keys yielding the desired location information.

In the illustrated instance the mile marker number and the starting vehicle mileage indicator number are stored in separate registers representing additions to the physical structure of a calculator of a known type. In FIG. 3 the conceptual organization of a typical microelectronic system is shown in which the added memory registers appear as MR1 and MR2 respectively. A detailed description of how inputs from the keyboard are handled within the calculator would appear to be unnecessary since these are disclosed in the aforementioned Scientific American article and are not modified by this invention. It can be noted, however, that under instructions programmed into the "Read-Only Memory" and as influenced by depression of a key "NE1" or "SW1" the mile marker number entered into the device is stored in memory register MR1. Similarly, the starting vehicle mileage indicator number as entered under activation of key "NE2" or "SW2" is instructed by the "Read-Only Memory" to be stored in memory register MR2. Under activation of a key "NE20" or "SW20" the subsequently entered vehicle mileage indicator number is routed along with the number from memory storage register MR2 to the Adder/Subtracter and the difference recycled in conjunction with the number in memory register MR1 to produce the new mile marker number, all of the process steps being in accordance with permanent instructions built into the "Read-Only Memory" and appropriate electronic connections as comprised in the "Control Circuitry".

Programming of the device to require but a single memory register also is possible but in this instance actuation of a key "NE2" or "SW2" would initiate an immediate processing of the mile marker number and the starting vehicle mileage indicator number to add these numbers together or to subtract one from the other according to which key "NE2" or "SW2" has been depressed. This resultant is stored in the provided memory register and upon actuation of the location key "NE20" or "SW20" the new vehicle mileage indicator number is subtracted from or added to the amount in the memory register, yielding the correct vehicle location number, having regard to the mile marker system.

In keeping with CB radio related use of the calculator-like device, it could be fitted with code keys having a relation to CB codes. For example, on-off code keys could be provided, as well as a code key to display the correct time, a code key for clearing and so on. Capabilities of time display are a part of systems using the timed impulses of a clock generator. The device might also include conventional arithmetical keys to aid in trucker or motorist in keeping track of highway tolls and other trip expenditures, with these being either separately or jointly accumulated.

The location finding feature of the calculator device may be used also in determining the remaining distance to a selected destination, highway turn off or the like. This operation would correspond to a south and west position finding operation except that instead of using "SW1" to enter a mile marker number there would be entered a number corresponding to the number of miles to the destination or turn off. Now, if sometime subsequently, the "SW20" key is depressed, starting and new vehicle mileage indicator numbers will be compared and the difference subtracted from the "Distance To" number, leaving for display a number which is the number of miles remaining to the destination. Separate, appropriately coded keys can be provided for this operation, if desired.

In another use of the device, a continuous display of passing miles is possible, which also can be used for location identification. In this instance, a starting mile marker is entered and there is additionally entered a number corresponding to the speed of the vehicle expressed in miles per hour. The mile marker number is displayed and under actuation of an appropriate code key such as "NE20" or "SW20" the clock signal is utilized progressively to increase or to reduce the display. For example, upon entry of a highway speed of 55, the illuminated display would increase or decrease by one-tenth of a mile every 1.0909 seconds, depending on whether the code key "NE" or "SW" has been activated. Operation of the unit can be more directly related to actual speed by utilizing a mechanical or electronic speed responsive means, responding for example to the speed of rotation of the vehicle axle or the like.

The sets of special function keys 19–21 and 22–24 are disclosed as occurring in side by side banks of keys. This is a convenient arrangement and facilitates a blocking out of the keys of one or the other set, using a single hinged cover plate 26. It will be evident, however, that the special function keys can be variously placed on the keyboard 12 as may be thought most convenient or desirable.

The display panel 11 may take any of the forms commonly seen in small electronic calculators, and in lieu of the light emitting diode segments shown there may be used a liquid crystal or other lighted number unit.

The special function keys are identified in part by letter symbols representative of direction. Obviously they could be identified using other symbols, or numerical or alphabetical representations or the like.

The use of code keys has been before mentioned and it will be understood that this concept can be extended, as for example to use a single "code" key in conjunction with a pair of alternatively operable directional keys. A cover plate could be used in this instance to cover one or the other of the directional keys. Under selected programming, the "code" key may then be used to initiate various desired function sequences.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A calculator-like device useful in a vehicle to locate the position of the vehicle relative to a point of reference on a given highway along which the vehicle is traveling comprising numerical key controlled means for input to said device of numerical information respectively and individually identifying a point of reference along said given highway and mileage readings referenced to spaced locations along said highway, and sequentially operated function keys operable to store said numerical information following the entry thereof, the last to operate of said function keys having in association therewith means to interrelate the total of said numerical information and to transmit an output signal from said device which accurately locates the position of said vehicle along said highway.

2. A calculator-like device according to claim 1, numerical keys being provided for entering into the device a number which is the number of a mile marker at a vehicle starting position and for entering into the device in first and second instances a number which in the first instance is the number displayed by a vehicle mileage indicator at a vehicle starting position and in the second instance is the number displayed by a vehicle mileage indicator at another vehicle position to which the vehicle has traveled from said starting position, the entry of the last named number producing in the device a display of a number which is the number of the mile marker nearest the vehicle at its said other position, said function keys being provided in pairs and the function keys of each pair being alternatively operable according to whether the mile marker numbers are in an increasing or decreasing order of progression.

3. A calculator-like device according to claim 2, wherein said function keys are arranged in banks of three each, a bank of keys being selected for sequential operation of the keys therein according to the direction of travel of the vehicle.

4. A calculator-like device according to claim 3, providing a keyboard embodying said numerical keys and said function keys, wherein blocking means having an attached relation to the keyboard is adjustable relatively thereto alternatively to deny access to a nonselected bank of keys while exposing for access a selected bank of keys.

5. A calculator-like device as in claim 1 wherein two of said function keys are respectively related to separate numerical inputs to said device which respectively represent a point of reference along said highway and the reading on the vehicle mileage indicator when said vehicle is adjacent to said point of reference and a third said function key is operatively related to a numerical input comprising a reading on the vehicle mileage indicator at a particular point along said highway the location of which must be identified.

6. A calculator-like device as in claim 1 wherein said function keys are provided in three pairs, one of each of which is selectively operated in any given use of said device, the selection being determined in accordance with the direction of the vehicle travel.

7. A calculator-like device according to claim 1 wherein said function keys are arranged in banks of three each, a bank of keys being selected for a sequential operation of the keys therein in accordance with the direction of travel of the vehicle.

8. A device according to claim 7 wherein means are provided to selectively block out non-selected banks of keys to obviate misoperation.

9. A device according to claim 7 wherein there are two banks of said keys and blocking means is provided in a manner to enable the coverage of one of said banks of keys while exposing the other for operation.

10. A device according to claim 7 including a keyboard embodying said numerical keys and said function keys and means for selectively blocking banks of keys while exposing one thereof for operation in accordance with the direction of travel of the vehicle.

11. A device in accordance with claim 1 wherein there are separate memory registers in connection with said numerical keys to separately receive and to store the respective numerical inputs one of which identifies said point of reference along said given highway and another of which identifies a mileage reading on the vehicle mileage indicator at the time the vehicle is adjacent said point of reference on said highway and the last to operate of said function keys is related to a third numerical input corresponding to the reading on the vehicle mileage indicator when the vehicle is positioned on said highway at a point disclosed from said point of reference.

12. A device according to claim 1 wherein said function keys are series operated and comprise three in number, two of said function keys are operatively related to store numerical input respectively identifying the reading on the vehicle mileage indicator at a particular point of reference along said highway and the mileage from said point of reference to a point of destination and the third said function key is operable in reference to an input of the reading of the vehicle mileage indicator at a particular point in the travel of the vehicle between the point of reference and the point of destination whereby the output from said device indicates the distance of the vehicle from the point of destination at the time of the reading of said vehicle mileage indicator to provide said third numerical input.

* * * * *

UNITED STATES PATENT AND TRADEMARK OFFICE
CERTIFICATE OF CORRECTION

PATENT NO. : 4,068,308
DATED : January 10, 1978
INVENTOR(S) : Lincoln I. Opper

It is certified that error appears in the above-identified patent and that said Letters Patent are hereby corrected as shown below:

Col. 1, line 39, "the", second occurrence, to read -- a --.

Col. 4, line 58, "of" is corrected to read -- or --.

Col. 7, line 10, "in" is corrected to read -- a --.

Col. 10, line 14, (Claim 11, line 12) "disclosed" is corrected to read -- displaced --.

Signed and Sealed this

Second Day of May 1978

[SEAL]

Attest:

RUTH C. MASON
Attesting Officer

LUTRELLE F. PARKER
Acting Commissioner of Patents and Trademarks